(12) United States Patent
Zhuang et al.

(10) Patent No.: US 11,763,504 B2
(45) Date of Patent: Sep. 19, 2023

(54) METHOD FOR DISPLAYING ELECTRONIC PRICE TAG, SERVER AND STORAGE MEDIUM

(71) Applicant: SHENZHEN MINEW TECHNOLOGIES CO LTD, Shenzhen (CN)

(72) Inventors: Yan Zhuang, Shenzhen (CN); Xihao Chen, Shenzhen (CN)

(73) Assignee: SHENZHEN MINEW TECHNOLOGIES CO LTD, Shenzhen (CN)

( * ) Notice: Subject to any disclaimer, the term of this patent is extended or adjusted under 35 U.S.C. 154(b) by 63 days.

(21) Appl. No.: 17/522,542

(22) Filed: Nov. 9, 2021

(65) Prior Publication Data

US 2022/0067998 A1 Mar. 3, 2022

Related U.S. Application Data

(63) Continuation-in-part of application No. PCT/CN2020/083664, filed on Apr. 8, 2020.

(30) Foreign Application Priority Data

Jun. 13, 2019 (CN) .......................... 201910511627.6

(51) Int. Cl.
    *G06T 11/60* (2006.01)
    *G09F 3/20* (2006.01)
    *H04L 101/622* (2022.01)

(52) U.S. Cl.
    CPC .............. *G06T 11/60* (2013.01); *G09F 3/208* (2013.01); *H04L 2101/622* (2022.05)

(58) Field of Classification Search
    CPC ..... G06T 11/60; G09F 3/208; H04L 2101/622
    See application file for complete search history.

(56) References Cited

U.S. PATENT DOCUMENTS

| 7,152,040 B1* | 12/2006 | Hawthorne | .......... G06Q 10/087 |
| | | | 705/14.1 |
| 2007/0181678 A1* | 8/2007 | Nilsson | .................. G06Q 30/00 |
| | | | 235/383 |

(Continued)

FOREIGN PATENT DOCUMENTS

| CN | 102279868 A | 12/2011 |
| CN | 103034856 A | 4/2013 |

(Continued)

OTHER PUBLICATIONS

International Searching Authority, International Search Report and Written Opinion for International Application No. PCT/CN2020/083664, dated Jul. 9, 2020, (10 pages), China National Intellectual Property Administration, Beijing, China.

*Primary Examiner* — Jin Cheng Wang
(74) *Attorney, Agent, or Firm* — Alston & Bird LLP

(57) ABSTRACT

An electronic price tag display method and an electronic price tag display system, a server and a computer readable storage medium. The method is applied to the server, and includes: obtaining basic information of data to be displayed in an image; converting the basic information into bitmap data; and delivering the bitmap data to an electronic price tag in order that the electronic price tag displays the content of the data to be displayed. By implementing the method, the process of manually editing bitmap data by the user is abandoned, the manpower resource and the time cost are saved, the efficiency of display control of the electronic price tag is improved, and the condition that the editing result is affected by human operation error is avoided simultaneously.

7 Claims, 2 Drawing Sheets

(56) References Cited

U.S. PATENT DOCUMENTS

| | | |
|---|---|---|
| 2008/0030843 A1 | 2/2008 | Shoji et al. |
| 2011/0302512 A1 | 12/2011 | Ishii |
| 2011/0303753 A1 | 12/2011 | Alleshouse |
| 2015/0112826 A1* | 4/2015 | Crutchfield, Jr. .. G06Q 30/0643 705/26.1 |
| 2016/0171486 A1* | 6/2016 | Wagner ................ G06Q 20/326 705/39 |
| 2018/0268468 A1* | 9/2018 | Levy .................. G06Q 30/0641 |
| 2018/0357451 A1* | 12/2018 | Tingler .............. G06K 7/10198 |
| 2020/0005683 A1* | 1/2020 | Guan ...................... G09F 3/208 |
| 2021/0026586 A1* | 1/2021 | Hu .......................... G06F 21/31 |
| 2021/0365653 A1* | 11/2021 | Feng ....................... G09F 9/372 |

FOREIGN PATENT DOCUMENTS

| | | |
|---|---|---|
| CN | 104021361 A | 9/2014 |
| CN | 106358075 A | 1/2017 |
| CN | 107027075 A | 8/2017 |
| CN | 107343259 A | 11/2017 |
| CN | 107704224 A | 2/2018 |
| CN | 108550175 A | 9/2018 |
| CN | 109587778 A | 4/2019 |
| CN | 110211484 A | 9/2019 |
| JP | 2007-276377 A | 10/2007 |

\* cited by examiner

METHOD FOR DISPLAYING ELECTRONIC PRICE TAG, SERVER AND STORAGE MEDIUM

CROSS REFERENCE TO RELATED APPLICATION

This application is a continuation-in-part of PCT patent application Serial No. PCT/CN2020/083664, with an international filing date of Apr. 8, 2020, which claims priority to Chinese patent application No. 201910511627.6 filed on Jun. 13, 2019 and entitled "method and system for displaying electronic price tag, server and storage medium", the contents each of which are incorporated herein by reference thereto.

TECHNICAL FIELD

The present disclosure relates to the technical field of applications of electronic tags, and particularly relates to an electronic price tag display method, a server and a computer readable storage medium.

BACKGROUND

Bitmap is also referred to as "bitmap image", "dot matrix image", "data image", "digital image". The bitmap is composed of pixels, the pixels are the smallest information units of the bitmap and are stored in an image grid. The quality of the bitmap image is determined by the number of pixels per unit length. The more the pixels in the unit length, the higher the resolution, and the better the effect of the image. Each pixel has a specific position and color value, the information of each pixel in the image, which includes the position of the pixel on the screen and the color of the pixel, is recorded in an order from left to right and from top to bottom.

The displayed images are all bitmap images for an electronic price tag, if a user is allowed to edit the bitmap image directly, a commonly used implementation method in the related art includes: generating a blank bitmap image, and then adding corresponding text bitmap data into the bitmap image to make this bitmap image data becomes the bitmap image data finally edited by the user. Since the bitmap data is obtained according to screen pixel selection, if a screen with a resolution of 100×200 is used, this method would require the user to edit 100×200 points of bitmap data, a large amount of time cost and manpower resources are inevitably consumed, and the efficiency is low, moreover, the process of manually editing data can also cause a human operation error, thereby affects bitmap image editing result.

Therefore, how to solve the above-mentioned problem is that a person skilled in the art should focuses on.

SUMMARY

An objective of the present disclosure is providing an electronic price tag display method, an electronic price tag display system, a server and a computer readable storage medium, manpower resources and time cost are conserved, the efficiency of display control of the electronic price tag is improved, and a condition that the editing result is affected by a human operation error is avoided.

In order to achieve the objective, an electronic price tag display method is disclosed in the present disclosure, the electronic price tag display method is applied to a server and includes:

obtaining basic information of data to be displayed in an image;

converting the basic information into bitmap data; and delivering the bitmap data to an electronic price tag in order that the electronic price tag displays a content of the data to be displayed.

Optionally, said obtaining the basic information of the data to be displayed in the image includes:

receiving the basic information of the data to be displayed in the image uploaded by a web client.

Optionally, before said receiving the basic information of the data to be displayed in the image uploaded by the web client, the method further includes:

receiving and performing an image editing instruction by means of the web client, and generating an edited image at the web client; and parsing, by the web client, the image to obtain the basic information of the data to be displayed in the image.

Optionally, the basic information is in a JSON format.

Optionally, said converting the basic information into the bitmap data includes:

generating a bitmap image corresponding to the basic information; and traversing the bitmap image to obtain bitmap data of all pixels in the bitmap image.

Optionally, said generating the bitmap image corresponding to the basic information includes:

generate the bitmap image by drawing in a blank bitmap according to a textual content of text data in the data to be displayed, a size and a position of the text data.

Optionally, said delivering the bitmap data to the electronic price tag includes:

delivering, by a gateway, the bitmap data to a corresponding electronic price tag based on a MAC address of the electronic price tag.

In order to achieve the objective, an electronic price tag display system is provided in the present disclosure, the electronic price tag display system is applied to a server and includes:

a server and an electronic price tag being in communication with the server;

the server is configured to:

receive basic information of data to be displayed in an image, wherein the basic information of data to be displayed in the image is uploaded by a web client;

convert the basic information of the data to be displayed into bitmap data; and deliver the bitmap data to the electronic price tag through a gateway;

the electronic price tag is configured to receive the bitmap data delivered from the server and display a content of the data to be displayed.

In order to achieve the objective, a server is provided in the present disclosure, the server includes:

a memory configured to store a computer program;

a processor configured to execute the computer program so as to:

obtain basic information of data to be displayed in an image;

convert the basic information into bitmap data; and deliver the bitmap data to an electronic price tag through a gateway in order that the electronic price tag displays a content of the data to be displayed.

In order to achieve the objective, a computer readable storage medium is provided in the present disclosure, the computer-readable storage medium stores a computer program, the computer readable storage medium is configured to, when executed by a processor, cause the processor to implement steps of the electronic price tag display method.

According to the above-mentioned technical solutions, the electronic price tag display method according to the present disclosure is applied to the server, and the method includes: obtaining the basic information of the data to be displayed in an image; converting the basic information into bitmap data; and delivering the bitmap data to the electronic price tag in order that the electronic price tag displays a content of the data to be displayed. It can be seen from the above descriptions that, after the basic information of the data to be displayed in the image is obtained, the basic information is converted into bitmap data which can be further transmitted to the electronic price tag to be displayed, the traditional bitmap image editing methods are abandoned, the process of manually editing bitmap data by the user is avoided, manpower resources and time cost are saved, the efficiency of display control of the electronic price tag is improved, and the condition that the editing result is affected by a human operation error is avoided simultaneously.

An electronic price tag display system, a server, and a computer readable storage medium are also provided in the present disclosure, the electronic price tag display system, the server, and the computer readable storage medium can also achieve the same technical effects described above.

It should be understood that, the above general descriptions and the subsequent detailed descriptions are merely for illustration, and cannot limit the present disclosure.

BRIEF DESCRIPTION OF THE DRAWINGS

In order to describe the embodiments of the present disclosure more clearly, a brief introduction regarding the accompanying drawings that need to be used for describing the embodiments of the present disclosure or the prior art is given below; it is apparent that the accompanying drawings described below are merely some embodiments of the present disclosure, the person of ordinary skill in the art may also acquire other drawings according to the current drawings without paying creative labor.

DESCRIPTION OF THE EMBODIMENTS

The technical solutions in the embodiments of the present disclosure will be described in detail below with reference to the accompanying drawings in the embodiments of the present disclosure. It is apparent that, the embodiments described below are merely some embodiments of the present disclosure, rather than all of the embodiments. Based on the embodiments in the present disclosure, other embodiments, which are obtained by the person of ordinary skill in the art at without paying creative labor, should all be included in the protection scope of the present disclosure.

In the prior art, if a user is allowed to edit a bitmap image directly, a commonly used implementation method for editing the bitmap image includes: generating a blank bitmap image, and then adding a corresponding text bitmap data into the bitmap image to make this bitmap image data becomes the bitmap image data finally edited by the user. Since the bitmap data is obtained according to screen pixel selection, if a screen with a resolution of 100×200 is used, this method requires the user to edit bitmap data with 100×200 pixels, a large amount of time and manpower resources are inevitably consumed, the efficiency is low, and a human operation error may occur in the process of manually editing data, and the human operation error affects a bitmap image data editing result.

Therefore, one embodiment of the present disclosure discloses an electronic price tag display method, which saves human resources and time costs, improves the efficiency of display control of the electronic price tag 400, and a condition that the editing result is affected by human operation error is avoided simultaneously.

Figure 1:
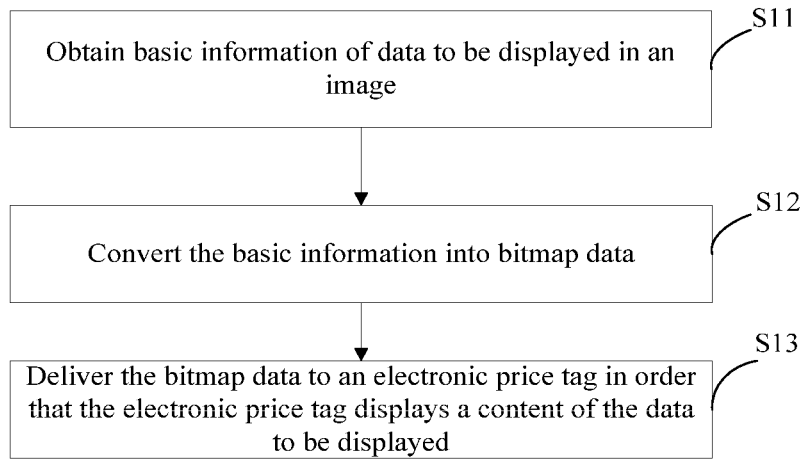
FIG. 1 illustrates a flow diagram of an electronic price tag display method disclosed by one embodiment of the present disclosure.

Referring to FIG. 1, an electronic price tag display method according to this embodiment of present disclosure is applied to a server 300, and the method includes:

at step S11, acquire basic information of data to be displayed in an image;

In this embodiment, the server 300 is utilized to acquire the basic information of the data to be displayed in the image. Wherein the image may be an image edited by a user through a web client 500 or a client terminal, and the data to be displayed is the image data which is edited by the user and is to be displayed on the electronic price tag 400, the data to be displayed may include text data, and may also include image content such as bar code, two-dimensional code, or some simple graphics, and image data. Specifically, the basic information of the text data may include but is not limited to a textual content, a position, and a size of the text data.

At step S12, convert the basic information into bitmap data;

In this step, the basic information of the data to be displayed is converted into the bitmap data. Specifically, a conversion tool may be used to convert the image into the bitmap to obtain the corresponding bitmap data. Of course, other methods may also be adopted, methods for converting basic information into bitmap data are not limited herein.

At step S13, deliver the bitmap data to an electronic price tag 400, so that the electronic price tag 400 displays the content of the data to be displayed.

It should be understood that, in this embodiment, after the bitmap data corresponding to the basic information of the data to be displayed is obtained, the bitmap data is delivered to the electronic price tag 400, so that the electronic price tag 400 uses the bitmap data to refresh so as to display the newest content corresponding to the data to be displayed.

Specifically, the process of delivering the bitmap data to the electronic price tag 400 may include: delivering the bitmap data to the corresponding electronic price tag 400 through a gateway 600 based on a MAC (Media Access Control) address of the electronic price tag 400.

According to the above-mentioned technical solutions, the electronic price tag display method according to the present disclosure is applied to the server 300, and the method includes: obtaining the basic information of the data to be displayed in an image; converting the basic information into bitmap data; and delivering the bitmap data to the electronic price tag 400 in order that the electronic price tag 400 displays a content of the data to be displayed. It can be seen from the above descriptions that, after the basic information of the data to be displayed in the image is obtained, the basic information is converted into the bitmap data which can be further transmitted to the electronic price tag 400 to be displayed, the traditional bitmap image editing methods are abandoned, the process of manually editing bitmap data by the user is avoided, manpower resources and time cost are saved, the efficiency of display control of the electronic price tag 400 is improved, and the condition that the editing result is affected by a human operation error is avoided simultaneously.

Figure 2:
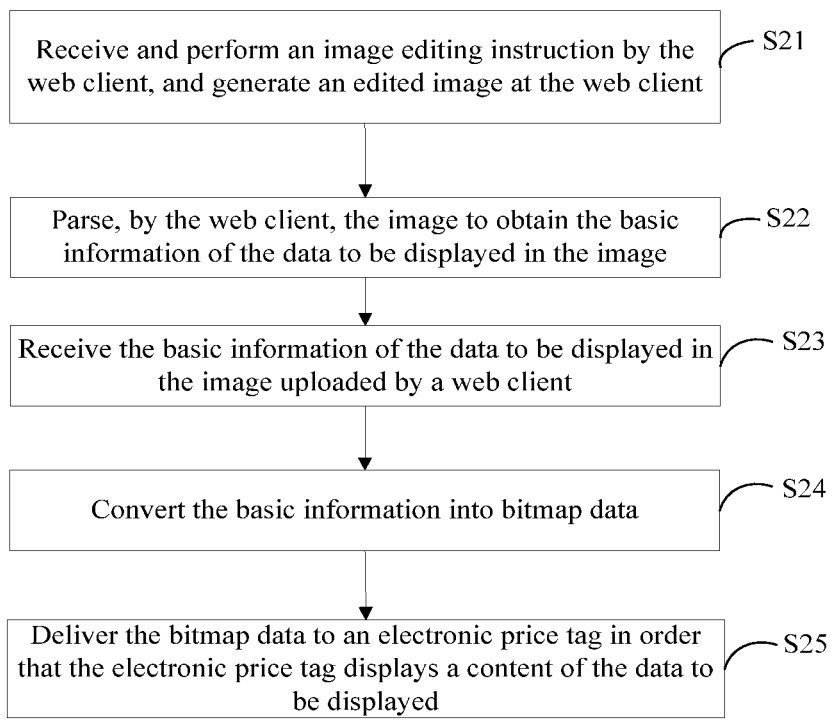
FIG. 2 illustrates a flow diagram of another electronic price tag display method disclosed by one embodiment of the present disclosure.

One embodiment of the present disclosure discloses another electronic price tag display method, technical solutions in this embodiment are further described and optimized with respect to the above-described embodiment. As shown in FIG. 2, the electronic price tag display method includes:

at step S21: receive and execute an image editing instruction by a web client 500, and generate an edited image at the web client 500;

In this embodiment, the web client 500 is used to receive and execute the image editing instruction sent by the user so as to generate the edited image from the user at the web client 500. Specifically, an editing interface may be provided to the user through a canvas program of the web client 500, so that the user is able to drag a text control towards a destination position through the canvas program, and edit the content of the text control.

At step S22, parse the image by the web client 500 to obtain the basic information of data to be displayed in the image; and In this step, after the image has been edited by the user by using the canvas program of the web client 500, data in the image edited by the user is parsed by the canvas program, and the basic information (e.g., a textual content, a coordinate system, and width and height information of the text data) of the data to be displayed in the image is obtained.

Furthermore, in order to facilitate transmission of the basic information of the data to be displayed, in this embodiment, the image is parsed and the basic information of the data to be displayed is parsed into a JSON format. Wherein the JSON format defines a field definition for each data in a key/value pair manner.

At step S23, receive the basic information of data to be displayed in an image uploaded by the web client 500;

In this embodiment, after the basic information of the data to be displayed is parsed by the web client 500, the basic information is uploaded to the server 300, so that the server 300 receives the basic information of the data to be displayed and performs a subsequent data processing operation.

At step S24, convert the basic information into the bitmap data.

At step S25, deliver the bitmap data to an electronic price tag 400 in order that the electronic price tag 400 displays the content of the data to be displayed.

Figure 3:
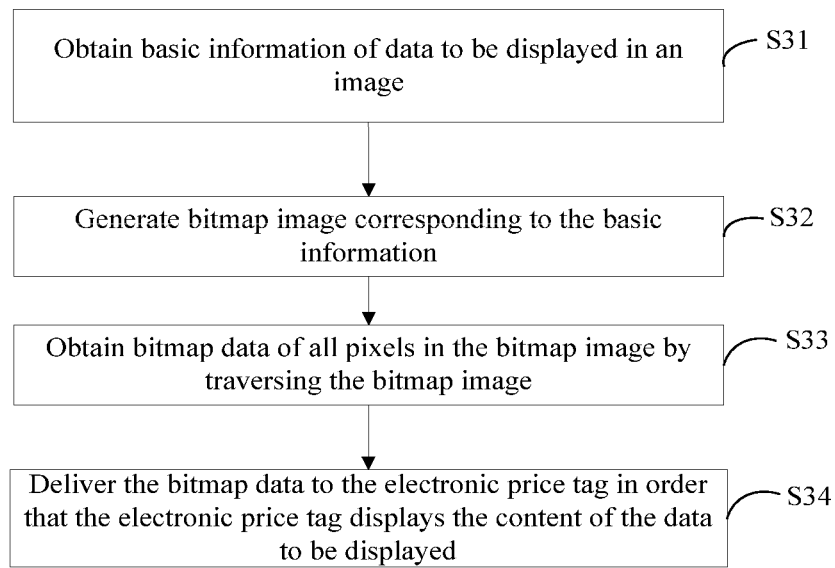
FIG. 3 illustrates a flow diagram of yet another electronic price tag display method disclosed by one embodiment of the present disclosure.

One embodiment of the present disclosure discloses yet another electronic price tag display method, technical solutions are further described and optimized in this embodiment with respect to the above-described embodiments. As shown in FIG. 3, this electronic price tag display method further includes:

At step S31, obtain basic information of data to be displayed in an image;

At step S32, generate a bitmap image corresponding to the basic information;

In this embodiment, the bitmap image is generated according to the basic information. Specifically, after the basic information is received, the blank bitmap having a size corresponding to the basic information is drawn first, and the bitmap image is further generated by drawing in the blank bitmap according to the basic information of the data to be displayed such as the textual content, the size, and the position of the text data.

At step S33, traverse the bitmap image to obtain bitmap data of all pixels in the bitmap image;

In this step, bitmap data of all pixels in the image is extracted from the image by traversing the entire bitmap image.

At step S34, deliver the bitmap data to an electronic price tag 400 in order that the electronic price tag 400 displays the content of the data to be displayed.

A specific electronic price tag 400 display method according to one embodiment of the present disclosure is described below in a manner of complete implementation process. In this embodiment, the electronic price tag 400 display method may be operated on a Web (Web page) client and a server 300. Wherein, at the side of the web client 500, the user edits the image through a canvas program provided by the web client 500; then, the canvas program is used to parse data of the image edited by the user, and the parsed data is transmitted to the server 300; in this exemplified embodiment, the parsed data may carry a coordinate system, a width and a textual content of each text data in the image, of course, the parsed data may further include other data such as two-dimensional code data, bar code data, etc., and the parsed data is not limited herein. At the side of the server 300, the image data transmitted from the web client 500 is received first, and a bitmap image having a size that corresponds to the image data is drawn, corresponding content is drawn according to the coordinate system and the width of the textual data, and the textual content in the bitmap image; after the drawing is completed, the bitmap data of all pixels is extracted through traversing the entire bitmap image, and the extracted bitmap data is further delivered to the electronic price tag 400 to be rendered, and finally, the content of the image which is edited by the user at the web client 500 can be displayed on the electronic price tag 400.

An electronic price tag display system according to one embodiment of the present disclosure is described below, cross-reference can be made to the electronic price tag display system described below and the electronic price tag display method described above.

Figure 4:
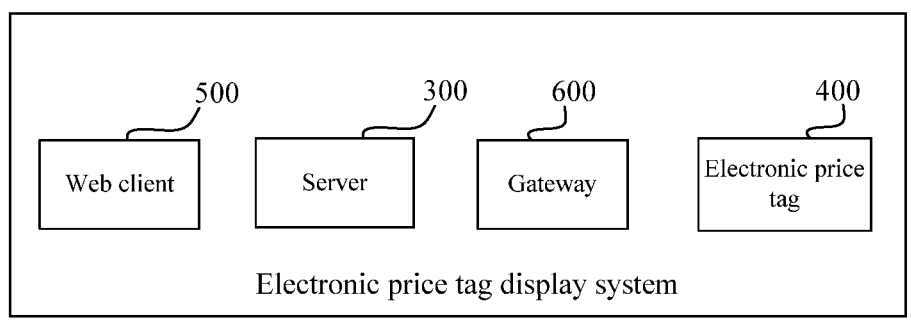
FIG. 4 illustrates a structural diagram of an electronic price tag display system disclosed by one embodiment of the present disclosure.

Referring to FIG. 4, an electronic price tag display system according to one embodiment of the present disclosure includes: a web client 500, a server 300 and an electronic price tag 400;

wherein the server 300 is configured to:

receive basic information of data to be displayed in an image, wherein the basic information of data to be displayed in the image is uploaded by a web client 500;

convert the basic information of the data to be displayed into bitmap data; and deliver the bitmap data to the electronic price tag 400 through a gateway 600;

the electronic price tag 400 is configured to receive the bitmap data delivered from the server 300, and display a content of the data to be displayed.

Figure 5:
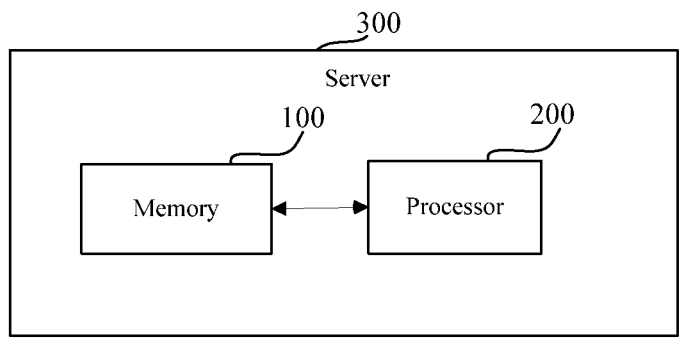
FIG. 5 illustrates a structural block diagram of a server disclosed by one embodiment of the present disclosure.

A server 300 is further provided in the present disclosure, as shown in FIG. 5, the server 300 according to one embodiment of present disclosure includes:

a memory 100 configured to store a computer program;

a processor 200 configured to execute the computer program so as to perform the steps of the electronic price tag display method disclosed in any one of the method embodiments.

Specifically, the memory 100 includes a non-volatile storage medium and an internal memory. The non-volatile storage medium stores an operating system and a computer readable instruction, the internal memory provides an environment for running the operating system and the computer readable instruction in the non-volatile storage medium. In some embodiments, the processor 200 may be a CPU (Central Processing Unit), a controller, a microcontroller, a microprocessor or other data processing chips which is configured to provide computing and controlling capabilities for the server 300, when the computer program stored in the memory 100 is executed, the steps of the electronic price tag display method disclosed in any one of the above-mentioned method embodiments can be implemented.

A computer readable storage medium is further provided in the present disclosure, the storage medium can include various mediums that can store program codes, the mediums can be such as a USB flash disk, a mobile hard disk, a ROM (Read Only Memory), a RAM (Random Access Memory), a magnetic disk, and an optical disk. The storage medium stores a computer program which, when executed by the processor, causes the processor to implement the steps of the electronic price tag display method disclosed in any one of the above-mentioned method embodiments.

According to the technical solutions described above, in the present disclosure, after the basic information of the data to be displayed in the image is obtained, the basic information is converted into bitmap data, then, bitmap data can be delivered to the electronic price tag 400 to be displayed, so that the traditional bitmap image editing methods are abandoned, the process of manually editing the bitmap data by the user is avoided, manpower resource and time cost are saved, the efficiency of display control of the electronic price tag 400 is improved, and the condition that the bitmap image editing result is affected by human operation error is avoided.

Various embodiments in the description are described in a progressive manner, the emphasis in each embodiment are different from the emphasis of other embodiments, regarding the same or similar descriptions among these various embodiments, reference can be made to each other. For the system disclosed in this embodiment, since the system corresponds to the method disclosed in other embodiments, a relatively simple descriptions of the system is given, regarding the relevant part, reference can be made to the descriptions in the method embodiments. It should be noted that, for a person of ordinary skill in the art, several improvements and modifications can be made to the present disclosure without departing from the principle of the present disclosure, and these improvements and modifications also fall within the scope of protection of the claims of the present disclosure.

It should also be noted that, in the description of the present disclosure, the terms which represents relationship such as the first and the second are merely used to distinguish one entity or one operation from another entity or another operation without necessarily requiring or implying that there is any such actual relationship or order between these entities or operations. Moreover, the terms "comprising", "including" or any other variation are intended to cover a non-exclusive inclusion, so that a process, a method, goods, or a device which includes a series of elements not only includes the elements, but also includes other elements that are not expressly listed, or includes the elements inherent to such process, method, goods, or device. In the absence of more limitations, an element which is defined by a sentence "includes one . . . " does not exclude a presence of additional identical elements in the process, the method, the goods, and the device which include the elements.

What is claimed is:

1. An electronic price tag display method implemented by a server, comprising:
   obtaining basic information of data to be displayed in an image;
   converting the basic information into bitmap data; and
   delivering the bitmap data to an electronic price tag in order that the electronic price tag displays a content of the data to be displayed,
   wherein:
      said obtaining the basic information of the data to be displayed in the image comprises receiving the basic information of the data to be displayed in the image uploaded by a web client;
      before said receiving the basic information of the data to be displayed in the image uploaded by the web client, the method further comprises:
         providing an editing interface to a user through a canvas program of the web client; receiving and performing an image editing instruction by the web client, and generating an edited image at the web client;
         parsing, by the canvas program of the web client, the image to obtain the basic information of the data to be displayed in the image, the basic information comprising a textual content, a coordinate system, and width and height information of the text data; and
      said converting the basic information into the bitmap data comprises:
         generating a bitmap image corresponding to the basic information; and
         traversing the bitmap image to obtain bitmap data of all pixels in the bitmap image.

2. The electronic price tag display method according to claim 1, wherein the basic information is in a JSON format.

3. The electronic price tag display method according to claim 1, wherein said generating the bitmap image corresponding to the basic information comprises:
   generate the bitmap image by drawing in a blank bitmap according to a textual content of text data in the data to be displayed, a size and a position of the text data.

4. The electronic price tag display method according to claim 1, wherein said delivering the bitmap data to the electronic price tag comprises:
   delivering, through a gateway, the bitmap data to a corresponding electronic price tag based on a MAC address of the electronic price tag.

5. A server, comprising:
   a memory configured to store a computer program; and
   a processor, wherein when executing the computer program, the processor is configured to implement following steps:
      obtaining basic information of data to be displayed in an image;
      converting the basic information into bitmap data; and
      delivering the bitmap data to an electronic price tag through a gateway in order that the electronic price tag displays a content of the data to be displayed,
      wherein:
         said obtaining the basic information of the data to be displayed in the image comprises receiving the basic information of the data to be displayed in the image uploaded by a web client;

before said receiving the basic information of the data to be displayed in the image uploaded by the web client, the method further comprises:

providing an editing interface to a user through a canvas program of the web client; receiving and performing an image editing instruction by the web client, and generating an edited image at the web client;

parsing, by the canvas program of the web client, the image to obtain the basic information of the data to be displayed in the image, the basic information comprising a textual content, a coordinate system, and width and height information of the text data; and said converting the basic information into the bitmap data comprises:

generating a bitmap image corresponding to the basic information; and traversing the bitmap image to obtain bitmap data of all pixels in the bitmap image.

6. The server according to claim 5, wherein when executing the computer program, the processor is configured to perform the following further steps of:

delivering, through a gateway, the bitmap data to a corresponding electronic price tag based on a MAC address of the electronic price tag.

7. A non-transitory computer-readable storage medium which stores a computer program, that, when being executed by a processor, causes the processor to implement steps in the electronic price tag display method comprising:

obtaining basic information of data to be displayed in an image from a web client;

converting the basic information into bitmap data; and delivering, through a gateway, the bitmap data to an electronic price tag in order that the electronic price tag displays a content of the data to be displayed, wherein:

said obtaining the basic information of the data to be displayed in the image comprises receiving the basic information of the data to be displayed in the image uploaded by a web client;

before said receiving the basic information of the data to be displayed in the image uploaded by the web client, the method further comprises:

providing an editing interface to a user through a canvas program of the web client; receiving and performing an image editing instruction by the web client, and generating an edited image at the web client;

parsing, by the canvas program of the web client, the image to obtain the basic information of the data to be displayed in the image, the basic information comprising a textual content, a coordinate system, and width and height information of the text data; and said converting the basic information into the bitmap data comprises:

generating a bitmap image corresponding to the basic information; and traversing the bitmap image to obtain bitmap data of all pixels in the bitmap image.

* * * * *